United States Patent Office 2,707,704
Patented May 3, 1955

2,707,704
PROCESS FOR THE PREPARATION OF HYPERICIN

Hans Brockmann and Friedhelm Kluge, Goettingen, Germany, assignors to Schenley Industries, Inc., New York, N. Y.

No Drawing. Application April 1, 1952,
Serial No. 279,948

Claims priority, application Germany September 29, 1951

6 Claims. (Cl. 204—158)

This invention relates generally to processes for obtaining, by routes of organic synthesis, a physiologically active plant principle heretofore obtained solely by processing of plant parts. More particularly, the invention relates to a method for the synthesis of hypericin, the physiologically active principle, so known from remote antiquity, derived from *Hypericum perforatum*, also known as St. John's wort. It has been established that this substance, hypericin, is 1:6:8:10:11:13-hexahydroxy-3:4-dimethyl-meso-naphthodianthrene-7:14-dione of the formula:

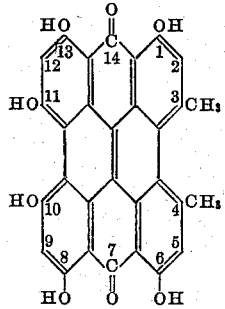

In accordance with this invention, hypericin may be synthesized by reactions broadly defined as follows: 1:3:8-trimethoxy-5-halo-6-methyl-anthraquinone (I) is treated with activated copper bronze in an indifferent organic solvent to cause an Ullmann biaryl condensation with formation of 1:1′:3:3′:8:8′-hexamethoxy-6:6′-dimethyl-5:5′-bianthraquinonyl (IIa) which can be demethylated, for example by treatment with pyridinium chloride, to yield 1:1′:3:3′:8:8′ - hexahydroxy - 6:6′ - dimethyl-5:5′-bianthraquinonyl (IIb). This last mentioned compound is converted to hypericin by initially effecting reductive linkage of the keto groups, with formation of 1:6:8:10:13:15 - hexahydroxy - 3:4 - dimethyl - o - meso-benzodianthrene 7:16-dione (IIIb), followed by ring closure linking the carbon atoms in the 11:12 positions to yield 1:6:8:10:11:13-hexahydroxy-3:4-dimethyl-meso-naphthodianthrene-7:14-dione (IVb, hypericin). If desired, the demethylation of the biaryl condensation product (IIa) may be eliminated altogether, with the result that the product is hypericin methyl ether (1:6:8:10:11:13-hexamethoxy - 3:4 - dimethyl - meso - naphthodianthrene-7:14-dione, compound IVa) or merely postponed to a later stage of the process. In either instance, the hypericin ether is obtained through the intermediate 1:6:8:-10:13:15 - hexamethoxy - 3:4 - dimethyl-o-meso-benzodianthrene-7:16-dione (IIIa), which, in the second instance, may be demethylated to 1:6:8:10:13:15-hexahydroxy - 3:4 - dimethyl - o - meso - benzodianthrene-7:16-dione (IIIb), or, alternatively, the demethylation step may follow the final ring closure step wherein the hypericin methyl ether (IVa) is formed. These reactions may be indicated generally as follows:

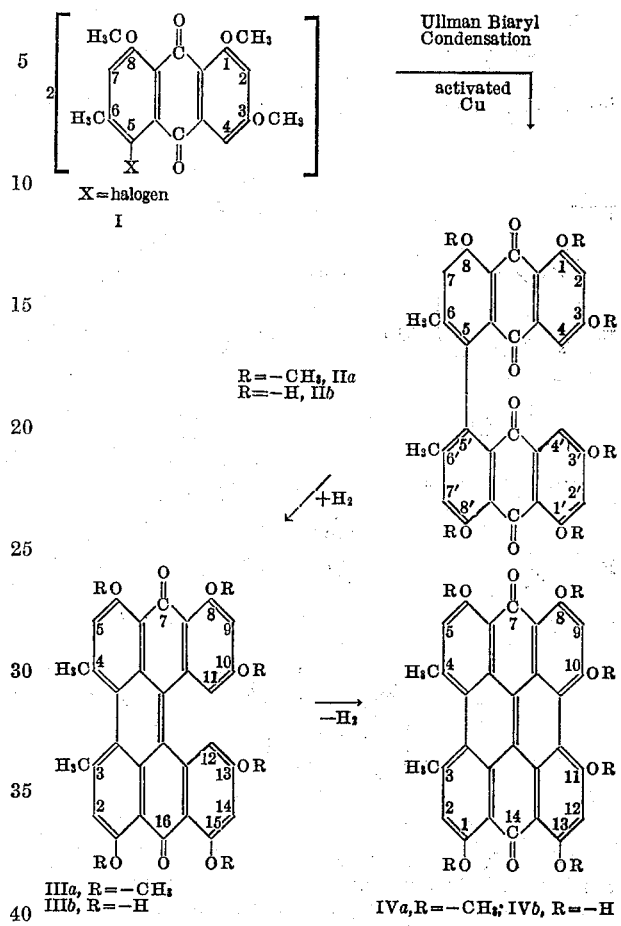

The starting materials utilized in the foregoing synthesis may be obtained by partial or total synthesis, as may be preferred. For example emodin (X), 1:3:8-trihydroxy-6-methyl-anthraquinone, may be converted to its methyl ether (XI) by treatment with a suitable methylating agent, such as dimethyl sulfate, then the ether may be treated directly with a halogenating agent, such as bromine, to yield the desired 1:3:8-trimethoxy-5-halo-6-methyl-anthraquinone (XII). Another method for making this starting material is to condense 3:5-dimethoxy-o-phthalic anhydride (XIII) with m-cresol (XIV) in the presence of aluminum chloride to obtain 2-(2′-hydroxy-4′-methyl-benzoyl) - 3:5 - dimethoxy-benzoic acid (XV) which may be directly halogenated, e. g. with bromine to obtain 2 - (2′-hydroxy-4′-methyl-5′-bromo-benzoyl)-3:5-dimethoxy-benzoic acid, M. P. 260° C. (type Formula XVI) or with chlorine to obtain the corresponding 5-chloro analog, M. P. 230°–235° C. following crystallization from glacial acetic acid. By treating this 5′-bromo compound with oleum ($SO_3$:7%) containing boric acid in an amount of about 3 times by weight the weight of 5′-bromo compounds used, cyclization occurs with formation of 1:3 - dimethoxy-5-bromo-6-methyl-8-hydroxy-anthraquinone (type Formula XVII), which may be converted to its alkali, e. g. sodium or potassium, salt and refluxed in acetone with excess dimethyl sulfate for about 1½ hours to yield 1:3:8-trimethoxy-5-bromo-6-methyl-anthraquinone (type Formula XII). In like manner the 5′-chloro compound may be converted to the 5-chloro analog of the dimethyl ether (reddish-brown needles melting at 230°–235° C.) which, after methylation, yields 1:3:8 - trimethoxy-5-chloro-6-methyl-anthraquinone (M. P. 213°–215° C. following crystallization from glacial acetic acid). These procedures for the preparation of the starting material utilized in the process of this invention may be indicated in summary form as follows:

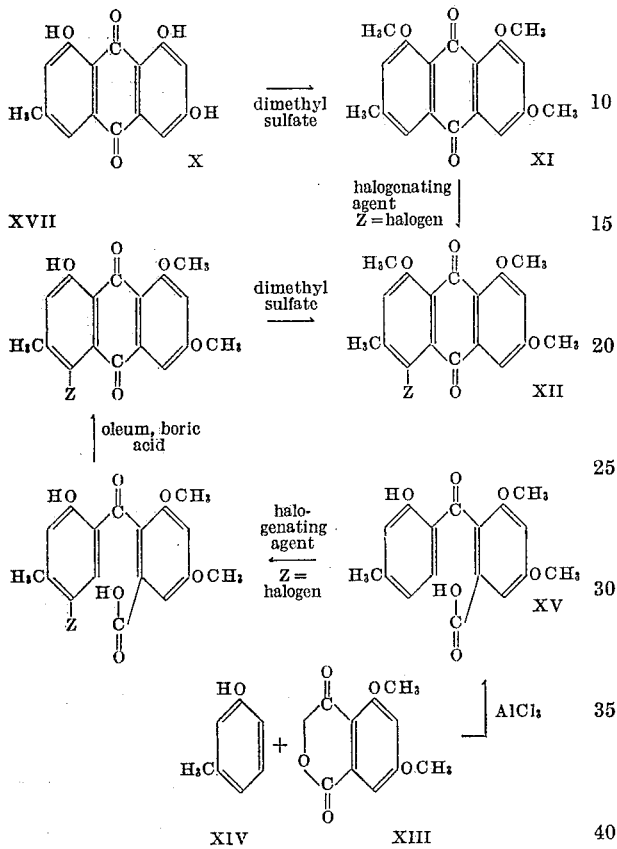

The coupling or condensation of the 1:3:8-trimethoxy-5-halo-6-methyl-anthraquinone (I) to form the biaryl compound (IIa) preferably is performed in an indifferent organic solvent medium such as nitrobenzene or molten naphthalene. The activated copper used in this reaction may be electrolytic copper in very finely divided condition, preferably activated by treatment with iodine. Commercial copper bronze does not invariably give satisfactory yields, but if it is activated by treatment, for 5 to 10 minutes, with 1 liter of a 2 per cent solution of iodine in acetone, per 100 grams of copper bronze, the results obtained are uniform. In this activation treatment, the copper bronze becomes of a grayish color due to formation of copper iodide, which is subsequently removed by washing the product with 500 milliliters of a mixture of equal parts by volume of concentrated hydrochloric acid and acetone, washing finally with acetone and drying in a vacuum desiccator. The product should be freshly prepared for use immediately before the biaryl condensation is effected.

It is preferred to effect the Ullmann condensation of 1:3:8 - trimethoxy-5-halo-6-methyl-anthraquinone (I) at an elevated temperature, using molten naphthalene as the reaction medium. The mixture may be maintained in molten condition and reaction temperature control is facilitated by use of a sand bath. The subsequent extraction of the condensation product (IIa) is facilitated by removing the reaction mixture, while molten, from the reaction vessel and mixing it with a divided inert material, such as sand, allowing the mass to cool and then grinding it before treating it with the extracting solvent. It is preferred to recover the condensation product chromatographically, using an aluminum oxide column.

The demethylation of 1:1':3:3':8:8'-hexamethoxy-6:6'-dimethyl-5:5'-bianthraquinonyl (IIa), or of the later methylated intermediate 1:6:8:10:13:15-hexamethoxy-3:4-dimethyl-o-meso-benzodianthrene-7:16-dione (IIIa), or of hypericin methyl ether (IVa), is effected by heating the compound to be demethylated, with pyridinium hydrochloride at a temperature near the melting point of the latter substance. The demethylated product may be extracted from the reaction mass with mild aqueous alkali, say an aqueous solution of sodium carbonate, and precipitated by acidifying this solution.

The cyclization of the bianthraquinonyl intermediate (IIa or IIb) through the o-meso-benzodianthrendione intermediate (IIIa or IIIb) to the meso-naphthodianthrenedione product (IVa or IVb) is effected by treating the first-mentioned substance in concentrated sulfuric acid, with copper bronze, for a period of several days and while the reaction mixture is subjected to artificial illumination in the ultraviolet region of the radiation spectrum. It is preferred to effect this cyclization as a single step, without isolation of the intermediate o-meso-benzodianthrenedione compound. Although this cyclization may be effected using either 1:1':3:3':8:8'-hexamethoxy- or 1:1':3:3':8:8' - hexahydroxy - 6:6'-dimethyl-5:5'-bianthraquinonyl, the former is preferred because the phenolic hydroxy groups of the latter compound appear to interfere somewhat with the formation of the desired intramolecular linkages, which may be explained as follows: The phenolic hydroxyl groups of intermediate IIb, when the compound is in concentrated sulfuric acid solution, are cationic due to absorption of protons, thus these groups, —OH$_2$+, at positions 3 and 3' of the bianthraquinonyl compound repel each other, hampering formation of the o-meso-benzodianthrenedione intermediate (IIIb). This inhibitory effect may be reduced by subjecting the reaction mixture to ultra-violet radiation during the cyclization step.

In order to facilitate a better understanding of the process of this invention, certain specific examples now follow, illustrating the synthesis of hypericin or its methyl ether, utilizing chloro- or bromo-emodin trimethyl ether (1:3:8 - trimethoxy - 5 - chloro (or bromo)-6-anthraquinone) as the starting materials. It will be understood that these examples are provided for purposes of illustration merely, and are not to be construed as limitations upon the scope of this invention.

EXAMPLE 1

In a glass tube about 0.5 cm. in diameter and 20 cm. long, closed at the bottom and heated in a sand bath, about 5 grams of 1:3:8-trimethoxy-5-chloro-6-methyl-anthraquinone and 3 grams of naphthalene are fused, then about 20 grams of activated copper bronze is added and the mixture is heated for about 2½ hours at 240° C. or thereabouts, and, near the end of this period, at about 300° C. The molten mixture is cast upon clean sand, cooled, ground, extracted with chloroform and chromatographed in an aluminum oxide filled column. The product, 1:1':3:3':8:8' - hexamethoxy - 6:6'-dimethyl-5:5'-bianthraquinonyl, is obtained as yellow prisms, melting at 335° to 338° C.

About 1 gram of this product is heated with 100 grams of pyridinium hydrochloride for about 5½ hours at 170° to 190° C., then the reaction mixture is cooled and extracted with aqueous sodium bicarbonate solution. Acidification of the extract with sulfuric acid causes precipitation of the demethylated product, 1:1':3:3':8:8'-hexahydroxy-6:6'-dimethyl-5:5'-bianthraquinonyl, which, after recrystallization, is obtained as orange red needles, melting at 360° C. with decomposition.

About 50 milligrams of this product, in 170 cc. of concentrated sulfuric acid containing about 750 milligrams of copper bronze, in a layer about 0.5 cm. deep, is exposed to radiation from a 20 cm. distant 200 watt lamp for a period of 4 days or thereabouts. During this period the solution acquires a red fluorescence. The suspended copper is removed by filtering the solution through glass wool, the filtrate is poured on ice and the material which is thereby precipitated is extracted with tetrahydrofuran, then recovered from the extract by adsorption on gypsum. The desired product, hypericin, is recovered from the adsorbate as a reddish-black powder, and its identity with the photodynamic principle obtained from *Hypericum perforatum* is established by data as follows:

*Characteristics absorption bands and color reactions*

| Solvent | Synthetic | Natural |
|---|---|---|
| pyridine | 603 (587) 556. final absorption from 545 | 603. 559. 520. |
| concentrated sulfuric acid | green, red fluorescence 651 final absorption from 605 | green, red fluorescence 651 598. |
| acetic anhydride and pyrobic acetate after heating. | green, red fluorescence 632 584 | green, red fluorescence 632 583. |
| red. acetylated in xylene, dehydrogenated with chloranil. | 623 573 | 623. 573. |

Above wavelengths in mu.

EXAMPLE 2

The process described in Example 1 is repeated with 1:3:8 - trimethoxy-5-bromo-6-methyl-anthraquinone substituted for its chloro-analog there utilized. The compound obtained as the final product is identical with that described in Example 1.

EXAMPLE 3

The process described in Example 1 is repeated except that instead of demethylating the intermediate 1:1':3:3':8:8' - hexamethoxy - 6:6' - dimethyl - 5:5'-bianthraquinonyl, this intermediate is cyclized to yield hypericin methyl ether, 1:6:8:10:11:13-hexamethyoxy-3:4 - dimethyl-meso-naphthodianthrene-7:4-dione, which is demethylated by heating with pyridinium chloride. The product so obtained is identical with that obtained by the process described in Example 1.

Having thus described the subject matter of this invention, what it is desired to secure by Letters Patent is:

1. The process that comprises heating a 1:3:8-trimethoxy-5-halo-6-methyl-anthraquinone with activated copper to effect an Ullmann biaryl condensation to yield 1:1':3:3':8:8' - hexamethoxy - 6:6' - dimethyl - 5:5'-bianthraquinonyl, and thereafter reacting this compound with copper bronze in concentrated sulfuric acid while subjected to ultraviolet radiation to effect cyclization with reductive linking, to yield, as the demethylated final product, 1:6:8:10:11:13 - hexahydroxy - 3:4 - dimethyl-meso-naphthodianthrene-7:14-dione.

2. The process defined in claim 1 wherein the demethylation step is performed prior to the cyclization step and consists of heating the intermediate 1:1':3:3':8:8' - hexamethoxy - 6:6' - dimethyl - 5:5'-bianthroquinonyl to yield its 1:1':3:3':8:8'-hexahydroxy-analog, then cyclizing this product to obtain hypericin.

3. The process defined in claim 2 wherein the 1:3:8-trimethoxy-5-halo-6-methyl-anthraquinone is 1:3:8-trimethoxy-5-chloro-6-methyl-anthraquinone.

4. The process defined in claim 2 wherein the 1:3:8-trimethoxy-5-halo-6-methyl-anthraquinone is 1:3:8-trimethoxy-5-bromo-6-methyl-anthraquinone.

5. The process defined in claim 1 wherein the demethylation step follows the cyclization step and consists of heating 1:6:8:10:11:13:-hexamethoxy-3:4-dimethyl-meso-naphthodianthrene-7:14-dione with pyridinium hydrochloride and recovering hypericin from the reaction mixture.

6. The process defined in claim 5 wherein the 1:3:8-trimethoxy - 5 - halo-6-methyl-anthraquinone is 1:3:8-trimethoxy-5-chloro-6-methyl-anthraquinone.

References Cited in the file of this patent

UNITED STATES PATENTS

| | | |
|---|---|---|
| 1,758,841 | Kunz et al. | May 13, 1930 |
| 1,834,876 | Smith et al. | Dec. 1, 1931 |
| 1,841,964 | Kunz et al. | June 19, 1932 |
| 1,872,492 | Ogilvie et al. | Aug. 16, 1932 |
| 2,002,247 | Moser et al. | May 21, 1935 |
| 2,599,587 | Schwartzman | June 10, 1952 |